UNITED STATES PATENT OFFICE.

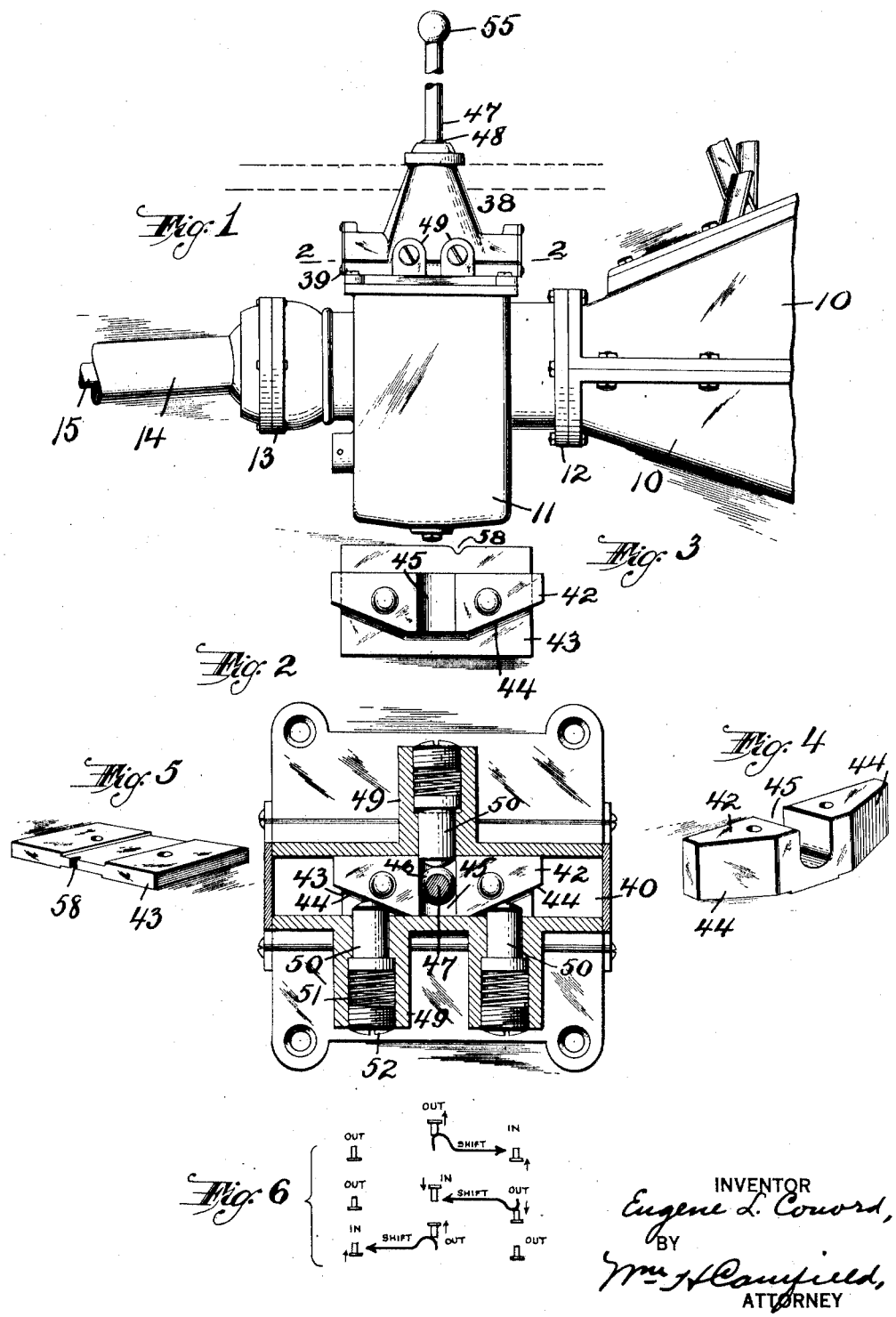

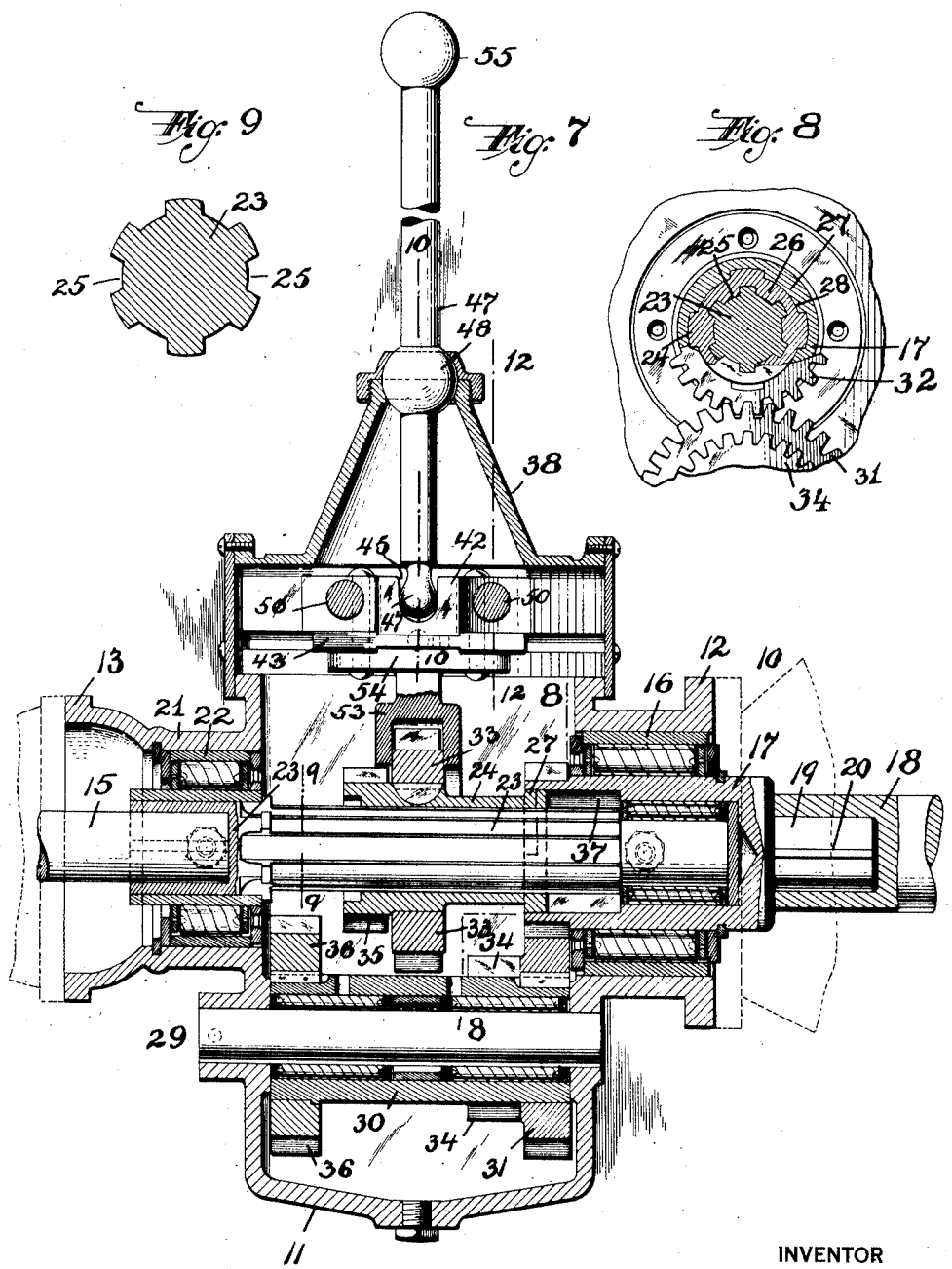

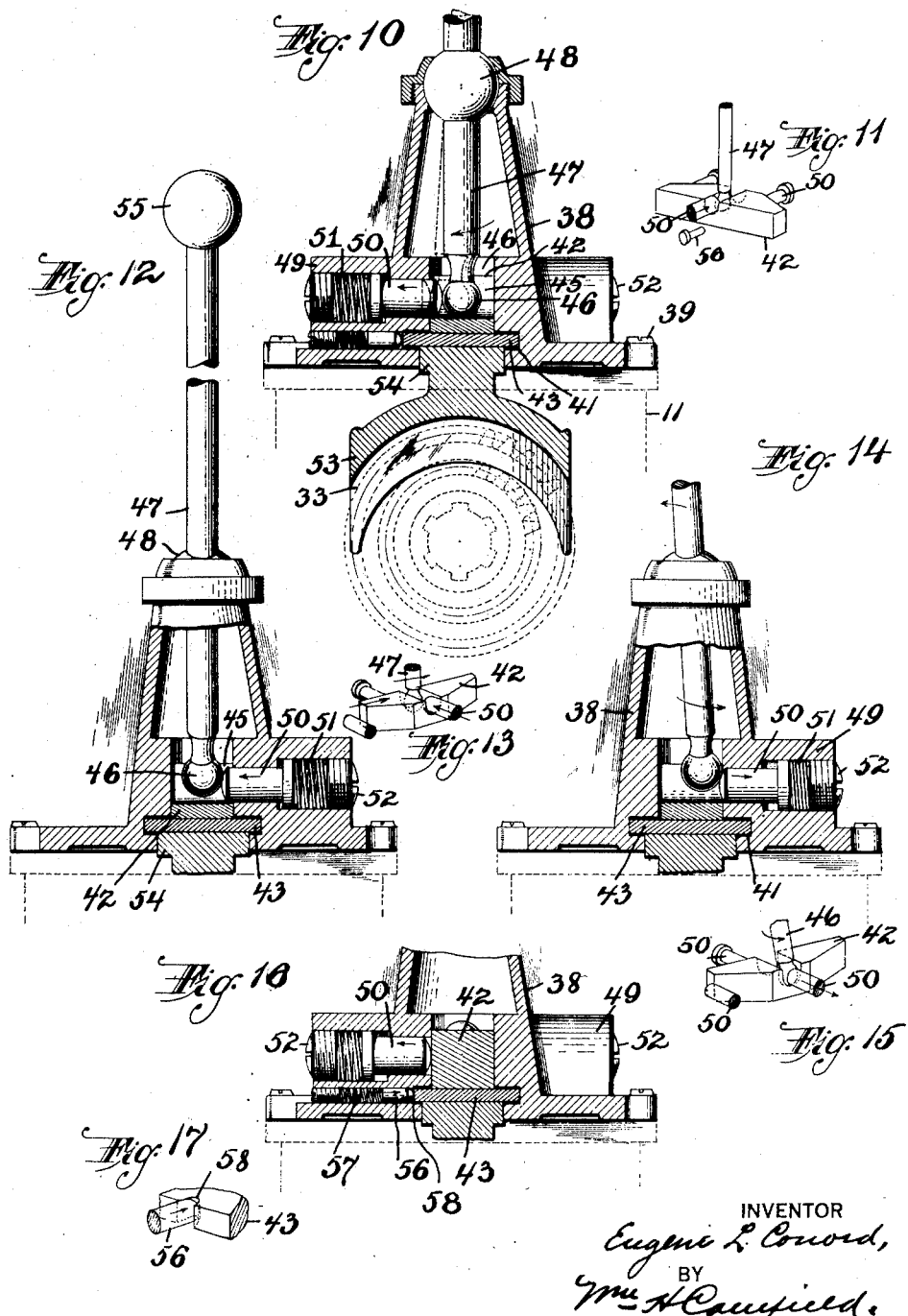

EUGENE L. CONORD, OF ELIZABETH, NEW JERSEY, ASSIGNOR TO ELIZABETH AUTO PARTS MANUFACTURING COMPANY, OF ELIZABETH, NEW JERSEY.

TRANSMISSION DEVICE.

1,390,764.            Specification of Letters Patent.     Patented Sept. 13, 1921.

Application filed December 27, 1920. Serial No. 433,327.

*To all whom it may concern:*

Be it known that I, EUGENE L. CONORD, a citizen of the United States, and a resident of Elizabeth, county of Union, and State of New Jersey, have invented certain new and useful Improvements in Transmission Devices, of which the following is a specification.

This invention relates to an improved transmission device which is applied to automobiles having normally but few speed changes in order that a greater variety of speeds is available in conjunction with the normal speeds.

The invention relates, further, to a transmission device which is compact and which can be quickly secured in place without radical changes in the structure of the car mechanism.

The invention also provides a shifting mechanism designed to protect the device from injury by preventing a quick shift from one extreme of speed to another.

The invention also resides in certain details of construction which will be more fully described hereinafter and finally embodied in the claims.

The invention is illustrated in the accompanying drawings, in which Figure 1 is a side view showing one of my improved transmissions secured in place on an automobile. Fig. 2 is a section on line 2—2 in Fig. 1. Fig. 3 is a top view of a slide used in the shifting mechanism. Figs. 4 and 5 are perspective views of the upper and lower members of the slide, respectively. Fig. 6 is a diagrammatic view showing the manner of operation of the shifting mechanism. Fig. 7 is a central longitudinal section of the mechanism shown in Fig. 1. Fig. 8 is a detail section on line 8—8 in Fig. 7, and Fig. 9 is a section on line 9—9 in Fig. 7. Fig. 10 is a cross-section on line 10—10 in Fig. 7, and Fig. 11 is a reduced perspective to more clearly bring out the relative position of the parts of the shifting mechanism. Fig. 12 is a section on line 12—12 in Fig. 7. Fig. 13 is a perspective to show the operation of the parts. Fig. 14 is a view similar to Fig. 12, but with a holding stud in retreated position. Fig. 15 is a small perspective to make the operation clear. Fig. 16 is a section similar to Fig. 10, but with the slide held in neutral position, and Fig. 17 is a detail perspective of the edge of the slide plate and the stud for holding it in neutral position.

This device is attached to an automobile directly behind the main transmission casing, which is shown at 10, and comprises a casing 11 which is bolted or otherwise secured, as at 12, to the casing 10 and at its rear end has a connection, as at 13, by means of which it is attached to the casing 14 which houses the main shaft 15 of an automobile which extends back to the differential gear casing on the rear axle, which differential gear casing is not shown.

The device is particularly adapted for attachment to those cars that have but few speeds, say two speeds, a high and a low, and permits an over-drive or an under-drive and also speeds intermediate of the normal speeds provided by the main transmission, the form shown comprising an arrangement that permits of six speeds with this auxiliary transmission, where but two speeds are available without it, and in reverse there are three speeds available instead of one without the device.

The front part of the casing 11 is designed to provide a support for the bearing 16, usually of the roller type in which rotates the fixed clutch member 17 having means on its outer end for attachment to what I term the driving shaft 18, the form of attachment illustrated including a stud 19 on the clutch member, which stud is secured, as by a key 20, in a socket on the driving shaft. At the back of the casing is a support 21 for the bearing 22 which supports one end of a stub shaft 23 which is secured to the front end of the main shaft 15. The stub shaft 23 is equipped with the sliding clutch member 24, these being held so that they rotate together, as, for instance, by providing the stub shaft with longitudinal grooves 25, into which the projections 26 of the clutch member project, the clutch member thus being adapted to slide longitudinally on the stub shaft.

The fixed and sliding clutch members have coacting parts which directly connect the sleeve 17, and consequently the driving shaft, with the stub shaft 23 and therefore the driven or main shaft 15. In the form shown this connecting means consists of a set of projections 27 which fit into recesses 28 of the sliding clutch member 24. The direct connection position is shown in Fig. 7, and the sliding clutch member can be slid through the fixed clutch member so that the transmission is selective instead of progressive.

The casing has a lower extension into which the jack-shaft 29 is secured, and a sleeve 30 rotates thereon. The sleeve 30 has a gear 31 which is in mesh with a gear 32 on the fixed clutch member, so that the sleeve 30 is being constantly rotated when the clutch member rotates. The sliding clutch member has a large gear 33 which engages the small gear 34 when the sliding clutch is slid in one direction from its direct drive position, and when slid in the other direction a small gear 35 of the sliding clutch member engages the large gear 36 of the sleeve 30.

It will be evident that the meshing of the gears 33 and 34 causes an increase of speed, and that of the gears 35 and 36 a reduction of speed, and, being applicable to definite speeds of the main transmission, makes it possible to have a lower low, a normal low, a higher low, a lower high (direct), a normal high (direct) and a higher high.

The shifting mechanism is preferably inclosed in an extension of the casing 11, which is in the form of a hood 38 fastened by screws 39 or similar means to the top part of the casing 10 and having a slide-way 40 which includes side grooves 41 at the bottom thereof to receive the slide, which is made up preferably of two members 42 and 43, these being shown in detail in Figs. 4 and 5, the member 42 of the slide having tapered ends, as at 44, the inclined faces thereof having a function which will be described hereinafter.

The slide has a central transverse slot 45, into which extends the end, preferably a ball-shaped end, 46 of the shift rod 47 which is supported in a ball-joint 48 at the top of the hood 38, so that it can be rocked sideways and also swung to the front and to the rear. Three pins are installed in the hood 38 which has sockets 49 for this purpose, each of the sockets 49 having a pin 50 therein, each being actuated by a spring 51 which is inclosed by a suitable screw 52, the inner ends of the pins 50 being somewhat rounded and being adapted to be engaged by the head 46.

When the device is in central position, as shown in Figs. 7, 10 and 11, the sliding clutch 23 is held in the position shown in Fig. 7, since the yoke 53, which has the two side pieces 54, extends down over the sides of the large gear 33 of the clutch member, and, being secured by means of the plate 54 to the bottom of the slide, it is rigidly held in this position, because the center pin 50 projects into the transverse slot 45 of the slide 42.

When the sliding clutch member is to be shifted to alter the speed ratio of the main shaft and the driving shaft, the handle 55 of the rod 47 is swung to the right, which forces the center pin 50 out of the transverse slot 45, as shown in dotted outline in Fig. 10. This releases the slide and the handle 55 can then be swung back, which moves the slide forward, since the ball head 46 of the rod 47 pushes the slide forward and then the forward pin 50 snaps into the groove 45, as shown in Fig. 13, having been caused to retreat by the forward inclined face 44 of the slide engaging the rounded inner edge of the pin.

The diagram in Fig. 6, at its top portion, clearly shows this movement of the end 46 of the shaft or handle 47.

In order to come back to the center position, the handle 55 is again swung transversely to force in the pin 50 at the front of the casing, and then swung back to permit the center pin to again snap into the slot 45, the end pins being on the opposite side of the casing from the center pin so that the bearing of the head 46 in the short travel of the slot is away from the side from which the next engaging pin will be projected.

Of course a similar movement is necessary when shifting the slide, and consequently the gear, in the opposite direction, which is simply a reversal of the steps shown in Figs. 10–15, inclusive.

At a proper point, preferably slightly to the side of and slightly below the center pin 50, I arrange an extensible pin 56 which is normally projected forward by the spring 57 and which is in line with the lower member 43 of the slide. The slide 43 has a shallow recess in its side edge, as at 58, which is adapted to receive a part of the rounded end of the pin 56. This is a pin to establish a neutral position of the slide and to hold it against accidental displacement therefrom, but is not strong enough to interfere with the normal operation of the slide.

When this pin is to be used, the center pin 50 is released, as shown in Figs. 10 and 11, and then the handle 55 is slowly moved so that the operator "feels" for the pin 56, and when it snaps into the notch 58 of the slide the center pin 50 is in the retreated position shown in Fig. 16 and the sliding clutch member has been slid far enough out of the fixed clutch member to release the projections 27 from the recesses 28, but not far enough to cause the gears 35 and 36 to be in mesh. This permits a rotation of the driving shaft 18 without any transmission of power beyond the end of the fixed clutch member 17, and the cranking of the car is therefore made easier, since it is not connected with the running mechanism of the car beyond the main transmission. This position is also evident to the operator, because in this position the handle 47 is not being operated by any of the spring-pressed fingers 50 and is somewhat wabbly in its position, so that this condition of the handle is an index to the neutral position of the auxiliary transmission.

I claim:

1. In a transmission, a shifting mechanism comprising a casing, a slide movable in the casing, the slide having a transverse slot therein, a center pin and end pins arranged to enter said slot, the center pin being on the side opposite the end pins, and means in said slot for moving the slide and capable of side movement to push back the pins.

2. In a transmission, a shifting mechanism comprising a casing, a slide movable in the casing, the slide having a transverse slot therein, a center pin and end pins arranged to enter said slot, the center pin being on the side opposite the end pins, and a shift rod pivoted so as to swing longitudinally and transversely and having its end arranged in the slot.

3. In a transmission, a shifting mechanism comprising a casing, a slide movable in the casing, the slide having a transverse slot therein, a center pin and end pins arranged to enter said slot, the center pin being on the side opposite the end pins, means in said slot for moving the slide and capable of side movement to push back the pins, and a supplemental pin to frictionally hold the slide in place when the slide is in a position in which none of the main pins are in the slot.

4. In a transmission, a shifting mechanism comprising a casing, a slide with its side tapered at the ends and having a transverse slot, a set of oppositely arranged pins yieldingly projected into the path of the slide and spaced apart longitudinally and adapted to enter the slot, a shifting rod with an end in the slot and movable longitudinally and transversely and adapted to retreat a pin from the slot and also move the slide, the arrangement of pins being such that the movement of the shifting rod to release the slide from one pin places said rod so that it is removed from the path of the next pin when it is projected into the slot.

5. In a transmission, a shifting mechanism comprising a casing, a slide with its side tapered at the ends, a central spring pin on one side, a pair of spring pins on the opposite side and flanking the central pin, the pins normally projecting into the path of the slide, the slide having a transverse slot to receive the pins, and a shifting rod with its end in the slot and adapted to engage the pins to cause them to retreat and also to move the slide.

6. In a transmission, a shifting mechanism comprising a casing, a slide with its side tapered at the ends, a central spring pin on one side, a pair of spring pins on the opposite side and flanking the central pin, the pins normally projecting into the path of the slide, the slide having a transverse slot to receive the pins, a shifting rod with its end in the slot and adapted to engage the pins to cause them to retreat and also to move the slide, and a supplemental spring pin between the central pin and one of the end pins, the slide having a slight depression to receive the pin in order to hold the slide against engagement with any of said main pins.

7. In a transmission, a shifting mechanism comprising a casing, a slide with its side tapered at the ends, a central spring pin on one side, a pair of spring pins on the opposite side and flanking the central pin, the pins normally projecting into the path of the slide, the slide having a transverse slot to receive the pins, a shifting rod with its end in the slot and adapted to engage the pins to cause them to retreat and also to move the slide, and a curved yoke secured to the slide and recessed to receive the upper part of a gear.

In testimony that I claim the foregoing, I have hereto set my hand, this 22nd day of December, 1920.

EUGENE L. CONORD.